(12) United States Patent
Huelke

(10) Patent No.: US 9,604,579 B2
(45) Date of Patent: Mar. 28, 2017

(54) ILLUMINATED COAT HOOK TO ASSIST IN LOCATING COAT HOOK IN THE DARK

(71) Applicant: FORD GLOBAL TECHNOLOGIES, LLC, Dearborn, MI (US)

(72) Inventor: David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/827,910

(22) Filed: Aug. 17, 2015

(65) Prior Publication Data

US 2017/0050573 A1 Feb. 23, 2017

(51) Int. Cl.
*B60R 7/10* (2006.01)
*F21V 9/00* (2015.01)
*F21V 33/00* (2006.01)
*F21Y 101/02* (2006.01)

(52) U.S. Cl.
CPC .................. *B60R 7/10* (2013.01); *F21V 9/00* (2013.01); *F21V 33/00* (2013.01); *F21Y 2101/02* (2013.01)

(58) Field of Classification Search
CPC ... B60R 7/10; F21V 9/00; F21V 33/00; F21Y 2010/02
USPC ................ 362/510, 488, 490, 396, 253, 234
See application file for complete search history.

(56) References Cited

U.S. PATENT DOCUMENTS

| | | | |
|---|---|---|---|
| 2,358,867 A * | 9/1944 | Madan | F21L 15/02 362/577 |
| 4,686,609 A | 8/1987 | Dykstra et al. | |
| 5,003,437 A * | 3/1991 | Barrett | F21L 11/00 114/221 R |
| 5,147,078 A * | 9/1992 | Flieder | B60R 7/10 211/119.1 |
| 5,411,233 A | 5/1995 | Grimes, III et al. | |
| 5,816,696 A * | 10/1998 | Beisler | A47F 5/0823 362/145 |
| 6,095,469 A | 8/2000 | Von Alman | |
| 6,315,357 B1 * | 11/2001 | Johnston | B60R 7/10 224/313 |
| 6,890,083 B2 * | 5/2005 | Cochran | F21V 21/406 362/109 |
| 8,827,516 B2 | 9/2014 | Stakoe et al. | |
| 9,314,920 B1 * | 4/2016 | Jutras, Jr. | E01H 1/12 |

FOREIGN PATENT DOCUMENTS

| | | |
|---|---|---|
| DE | 19955621 B4 | 9/2005 |
| DE | 102008031011 A1 | 12/2009 |
| EP | 2305516 A1 | 4/2011 |

(Continued)

OTHER PUBLICATIONS

English machine translation of DE19955621B4.

(Continued)

*Primary Examiner* — Laura Tso
(74) *Attorney, Agent, or Firm* — Vichit Chea; King & Schickli, PLLC

(57) ABSTRACT

An illuminated coat hook assembly is provided. That coat hook assembly includes a body in the shape of a hook and a light source carried on the body. That light source may take the form of a light emitting diode and further include a rylene die section carried on the body that is powered by the light emitting diode to illuminate the coat hook assembly in a glow of desired color.

16 Claims, 4 Drawing Sheets

(56) References Cited

FOREIGN PATENT DOCUMENTS

WO    2014/073983 A1    5/2014

OTHER PUBLICATIONS

English machine translation of DE102008031011A1.
Alone: LED-Illuminated Coat Hooks at Pallucco; http://dolcera.com/upload/files/Alone LED-illuminated coat hooks at Pallucco-Por Homme-Mens Lifestyle Fashion and Culture Magazine.pdf.

* cited by examiner

ILLUMINATED COAT HOOK TO ASSIST IN LOCATING COAT HOOK IN THE DARK

TECHNICAL FIELD

This document relates generally to the motor vehicle equipment field and, more particularly, to an illuminated coat hook assembly for a motor vehicle.

BACKGROUND

It is well known in the art to provide a coat hook on the headliner above a rear door of a motor vehicle. Such a coat hook provides a convenient place to hang a coat or clean laundry during vehicle operation.

At night in a dark vehicle, it can be difficult to locate the interior coat hook. Potentially, a user attempting to stow or retrieve an article of clothing in low ambient light conditions could snag a hanger on the headliner resulting in customer dissatisfaction and a costly repair.

This document relates to an illuminated coat hook assembly which will allow a user to quickly and conveniently locate the coat hook even in low ambient light conditions.

SUMMARY

In accordance with the purposes and benefits described herein, an illuminated coat hook assembly is provided. That illuminated coat hook assembly comprises a body in the shape of a hook and a light source carried on and, more particularly, in the body. In one possible embodiment, that light source is a light emitting diode. Further, that light source may include a rylene die section carried on the body. That rylene die section is powered by the light emitting diode and functions to illuminate the coat hook assembly in a desired color.

In yet another possible embodiment, the coat hook assembly further includes a proximity sensor carried on the body. In addition, a controller is provided to activate the light emitting diode and illuminate the rylene die section in response to the proximity sensor for a predetermined duration of time.

In one possible embodiment, the rylene die section forms an interior curve of the hook-shaped body. In one possible embodiment, the proximity sensor is carried along an exterior curve of the hook-shaped body. Still further, the body may include a mounting aperture. The fastener is received in the aperture securing the coat hook assembly to the motor vehicle.

In accordance with an additional aspect, a motor vehicle is provided incorporating the illuminated coat hook assembly.

In accordance with yet another aspect, a method is provided for locating a coat hook assembly in a motor vehicle in the dark. That method comprises illuminating the coat hook assembly with a light source carried on the body of the coat hook assembly. Further, the method may include illuminating the coat hook assembly with other ambient lighting in the motor vehicle.

Still further, the method may include equipping the coat hook assembly with a proximity sensor and illuminating the coat hook assembly for a predetermined duration of time in response to a signal received from the proximity sensor by a controller.

Still further, the method may include illuminating the coat hook assembly in a first color in response to a first user selection and illuminating the coat hook assembly in a second color in response to a second user selection made on a color selector.

The method may also include using a light emitting diode to illuminate the coat hook assembly. Further, that light emitting diode may be utilized in conjunction with a cooperating rylene die section to illuminate the coat hook assembly. Still further, the method may include providing the light source within a cavity in the body of the coat hook assembly.

In the following description, there are shown and described several preferred embodiments of the illuminated coat hook assembly. As it should be realized, the illuminated coat hook assembly is capable of other, different embodiments and its several details are capable of modification in various, obvious aspects all without departing from the illuminated coat hook assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the illuminated coat hook assembly and together with the description serve to explain certain principles thereof. In the drawing figures.

Reference will now be made in detail to the present preferred embodiments of the illuminated coat hook assembly, examples of which are illustrated in the accompanying drawing figures.

DETAILED DESCRIPTION

Figure 1:
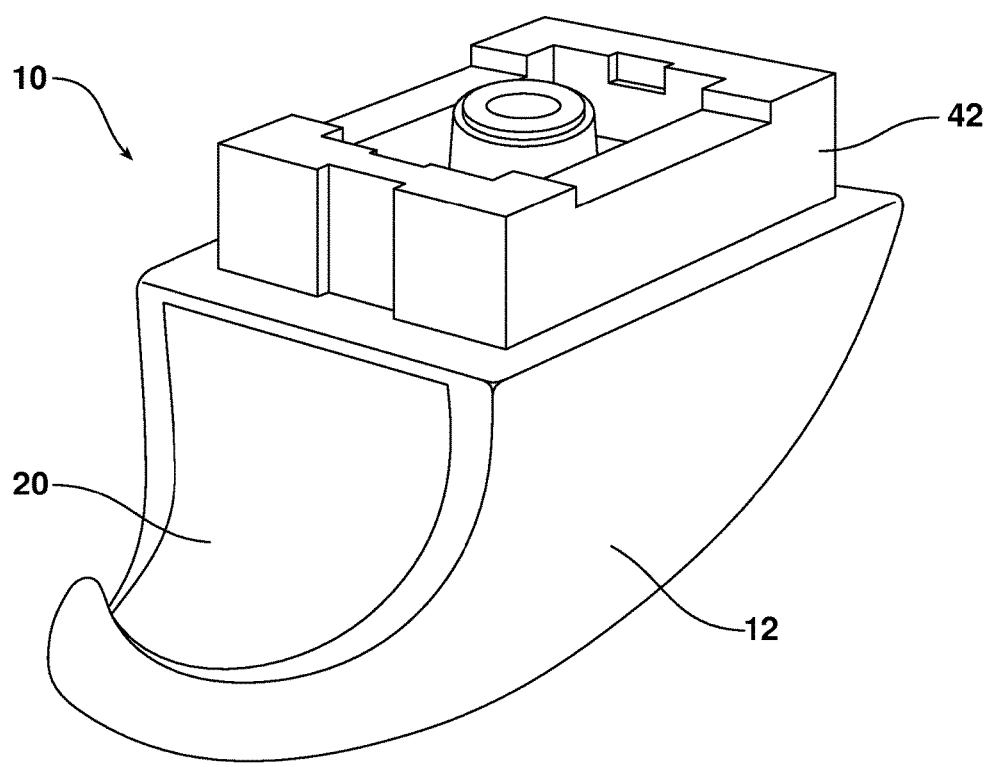
FIG. 1 is a perspective view of the illuminated coat hook assembly that is the subject matter of this document
Figure 2:
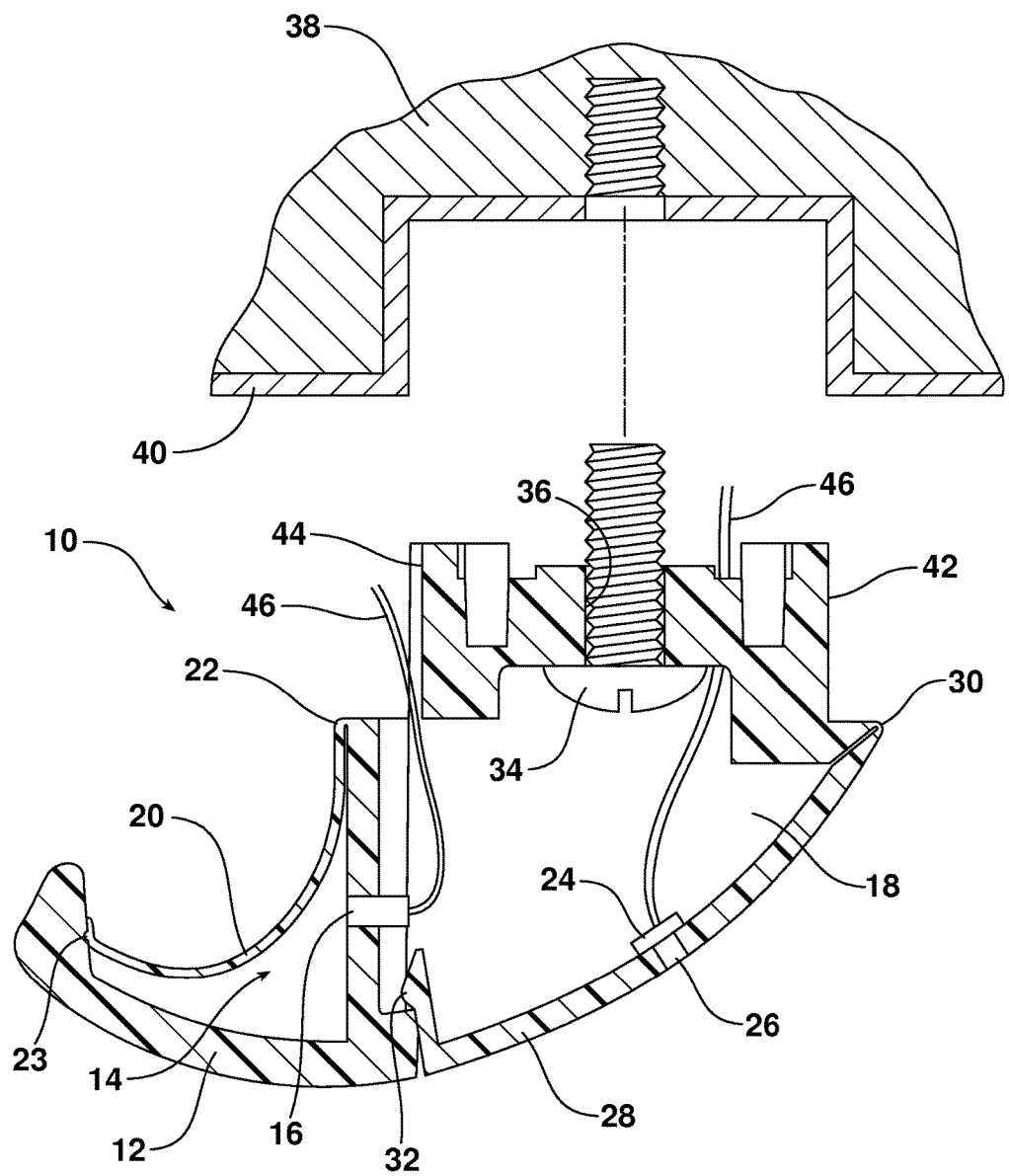
FIG. 2 is a detailed cross-sectional view of the coat hook assembly illustrated in FIG. 1.
Figure 3:
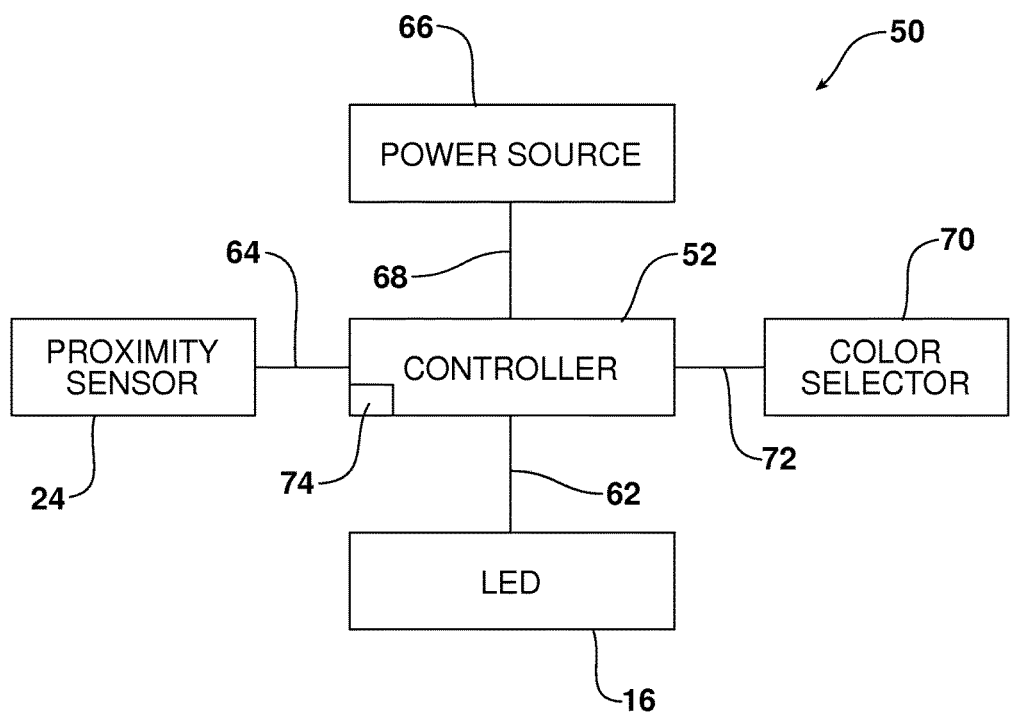
FIG. 3 is a schematic block diagram of the system to control the illumination of the coat hook assembly.

Reference is now made to FIGS. 1-3 illustrating the illuminated coat hook assembly 10 that is the subject matter of this document. As illustrated in FIGS. 1 and 2, the illuminated coat hook assembly includes a body 12 in the shape of a hook. A light source, designated generally by reference number 14, comprises a light emitting diode (LED) 16 held in a cavity 18 inside the body 12. In addition, a rylene die section 20 is carried on the body 12. The rylene die section 20 is powered by the LED 16 and glows in a desired color in order to provide a self-illuminating coat hook assembly 10 that is easy to find in low ambient light conditions. In one possible embodiment, the rylene die section 20 is a door connected to the body 12 by means of a living hinge 22 and a cooperating snap latch 23. That rylene die section or door 20 may be open when desired in order to gain access to the LED 16 in the cavity 18. As should be appreciated, the LED 16 is provided in the cavity 18 adjacent to the rylene die section 20 to ensure that the rylene die section 20 at the interior of the hook shaped body 12 is properly powered and provides the desired color as part of the coat hook assembly 10.

In accordance with an additional aspect, a proximity sensor 24 is also carried on the body. The proximity sensor 24 may be provided in the cavity 18 with a detection end thereof that extends into the port 26 in the body 12 along an exterior curve of the body. Here it should be noted that the body 12 may include an additional door 28, having a living hinge 30 and a snap latch 32, that allows access to the fastener 34.

As is further illustrated in FIG. 2, the body 12 includes a mounting aperture 36. The fastener 34, in the form of a screw, is received in the mounting aperture 36 and engages a receiver 38 behind the headliner 40 to secure the coat hook assembly 10 to the motor vehicle. More specifically, the inset mounting end 42 of the body 12 is received through the headliner 40. Grooves or other passages 44 allow the control wiring 46 to reach the LED 16 and the proximity sensor 24 carried within the cavity 18 of the body 12.

Figure 4:
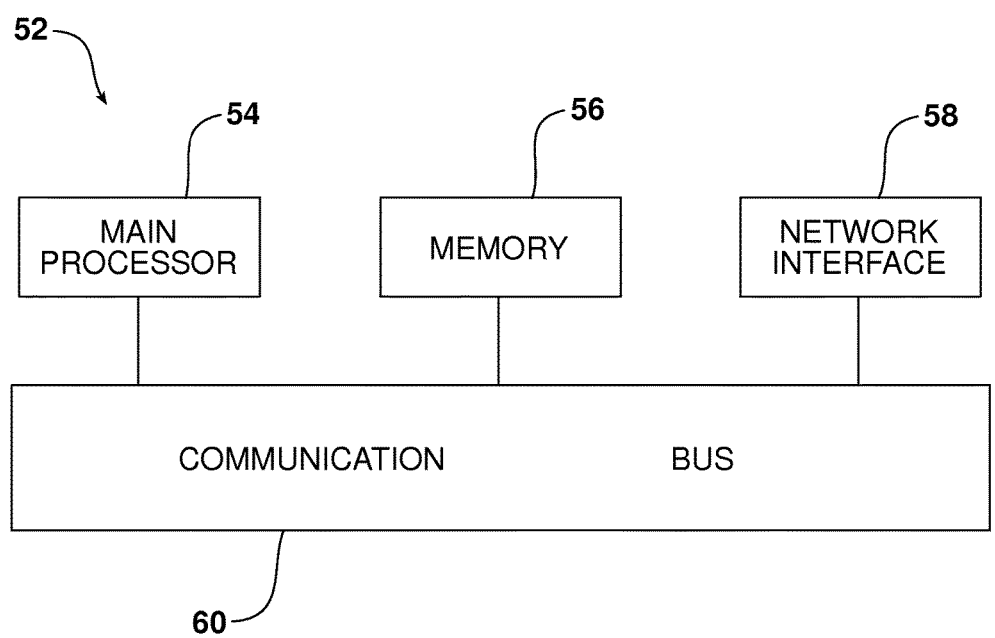
FIG. 4 is a schematic block diagram of the controller used in the system illustrated in FIG. 3.

Reference is now made to FIG. 3 which illustrates the illumination control system 50 of the coat hook assembly 10. In the illustrated embodiment, the illumination control system 50 contains a controller 52, such as a dedicated microprocessor or an electronic control unit (ECU) operating software instructions. Such a controller 52 may include one or more processors 54, one or more memories 56, and one or more network interfaces 58 which all communicate with each other over a communications bus 60. See FIG. 4.

As illustrated in FIG. 3, the controller 52 is connected to the LED 16 by means of a control line 62, the proximity sensor 24 by means of a control line 64, a power source 66 within the motor vehicle by means of power line 68 and the color selector 70 by means of a control line 72. The color selector 70 may comprise a switch or other mechanism allowing the vehicle operator to select the color in which he or she wishes the rylene die section 20 to glow. Thus, for example, the coat hook assembly 10 may be illuminated or glow in a first color in response to a first user selection made with the color selector 70 and in a second color in response to a second user selection made on the color selector. Here it should also be appreciated that the coat hook assembly 10 may be illuminated or glow with other ambient lighting of a type known in the art that is provided in a motor vehicle. Further, it should be appreciated the controller 52 may include or be connected to a timer 74. As the user comes within the activation range of the proximity sensor 24, a signal is sent along the control line 64 to the controller 52. The controller 52 reacts in response to that signal to illuminate the coat hook assembly via the control line 62 connecting the controller 52 to the LED 16. In this situation, the timer 74 functions to maintain the illumination of the coat hook assembly 10 including, particularly, the power to the LED 16 and the rylene die section 20 for a predetermined duration of time as determined by the timer in response to the signal received from the proximity sensor 24.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An illuminated coat hook assembly, comprising:
   a body in a shape of a hook;
   a light source carried on said body, wherein said light source is a light emitting diode; and
   a rylene die section carried on said body, said rylene die section being powered by said light emitting diode.

2. The illuminated coat hook assembly of claim 1, further including a proximity sensor carried on said body.

3. The illuminated coat hook assembly of claim 2, further including a controller to activate said light emitting diode and illuminate said rylene dye section in response to said proximity sensor for a predetermined duration of time.

4. The illuminated coat hook assembly of claim 3, wherein said rylene die section forms an interior curve of said hook shaped body.

5. The illuminated coat hook assembly of claim 4, wherein said proximity sensor is carried along an exterior curve of said hook shaped body.

6. The illuminated coat hook assembly of claim 5, wherein said body includes a mounting aperture.

7. The illuminated coat hook assembly of claim 6, further including a fastener received in said aperture for securing said coat hook assembly to a motor vehicle.

8. The illuminated coat hook assembly of claim 1, wherein said light emitting diode is carried within a cavity of said body adjacent said rylene die section.

9. The illuminated coat hook assembly of claim 8, wherein said rylene dye section is a door connected to said body by a living hinge, said door allowing access to said light emitting diode within said cavity.

10. A motor vehicle incorporating the illuminated coat hook assembly set forth in claim 1.

11. A method of locating a coat hook assembly in a motor vehicle in the dark, comprising:
    providing a light source within a cavity inside a body of said coat hook assembly;
    mounting the coat hook assembly in a motor vehicle; and
    illuminating said coat hook assembly with the light source carried within the cavity inside the body of said coat hook assembly.

12. The method of claim 11 including illuminating said coat hook assembly to glow with other ambient lighting in the motor vehicle.

13. The method of claim 11, including equipping said coat hook assembly with a proximity sensor and illuminating said coat hook assembly for a predetermined duration of time in response to a signal received from said proximity sensor by a controller.

14. The method of claim 11 including illuminating said coat hook assembly in a first color in response to a first user selection and illuminating said coat hook assembly in a second color in response to a second user selection made on a color selector.

15. The method of claim 11, including using a light emitting diode to illuminate said coat hook assembly.

16. The method of claim 11, including using a light emitting diode and a cooperating rylene dye section to illuminate said coat hook assembly.

* * * * *

UNITED STATES PATENT AND TRADEMARK OFFICE
CERTIFICATE OF CORRECTION

PATENT NO. : 9,604,579 B2  Page 1 of 1
APPLICATION NO. : 14/827910
DATED : March 28, 2017
INVENTOR(S) : David Huelke It is certified that error appears in the above-identified patent and that said Letters Patent is hereby corrected as shown below:

In the Specification
Column 1, Line 34, please replace "die" with ---dye---.
Column 1, Line 35, please replace "die" with ---dye---.
Column 1, Line 41, please replace "die" with ---dye---.
Column 1, Line 44, please replace "die" with ---dye---.
Column 2, Line 7, please replace "die" with ---dye---.
Column 2, Line 51, please replace "die" with ---dye---.
Column 2, Line 52, please replace "die" with ---dye---.
Column 2, Line 55, please replace "die" with ---dye---.
Column 2, Line 58, please replace "die" with ---dye---.
Column 2, Line 61, please replace "die" with ---dye---.
Column 2, Line 62, please replace "die" with ---dye---.
Column 3, Line 31, please replace "die" with ---dye---.
Column 3, Line 48, please replace "die" with ---dye---.
Column 4, Line 6, please replace "die" with ---dye---. (Both occurrences)
Column 4, Line 15, please replace "die" with ---dye---.
Column 4, Line 27, please replace "die" with ---dye---.

Signed and Sealed this
Thirtieth Day of May, 2017

Michelle K. Lee
*Director of the United States Patent and Trademark Office*